(12) United States Patent
Ohtsuka

(10) Patent No.: US 6,603,727 B1
(45) Date of Patent: Aug. 5, 2003

(54) OPTICAL SYSTEM DRIVING DEVICE HAVING IMPROVED VIBRATIONAL CHARACTERISTICS AND OPTICAL RECORDING APPARATUS INCORPORATING THE SAME

(75) Inventor: Shin-ichi Ohtsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/492,097

(22) Filed: Jan. 27, 2000

(30) Foreign Application Priority Data

Mar. 30, 1999 (JP) ............................................. 11-090089

(51) Int. Cl.[7] ................................................ G11B 3/70
(52) U.S. Cl. ....................................................... 369/247
(58) Field of Search ................................. 369/247, 263

(56) References Cited

U.S. PATENT DOCUMENTS

| | | | | |
|---|---|---|---|---|
| 5,323,378 A | * | 6/1994 | Kim et al. ................... | 369/247 |
| 5,663,843 A | * | 9/1997 | Ezawa et al. ................ | 359/824 |
| 6,069,867 A | * | 5/2000 | Ikegame ..................... | 359/824 |

FOREIGN PATENT DOCUMENTS

| | | |
|---|---|---|
| JP | 61258346 | 11/1986 |
| JP | 240139 | 2/1990 |
| JP | 5314512 | 11/1993 |
| JP | 5325219 | 12/1993 |
| JP | 7006387 | 1/1995 |
| JP | 9054960 | 2/1997 |
| JP | 9102133 | 4/1997 |

* cited by examiner

*Primary Examiner*—David Davis
(74) *Attorney, Agent, or Firm*—Greer, Burns & Crain, Ltd.

(57) ABSTRACT

Disclosed are an optical system driving device, for preventing the unwanted vibration of an elastic member supporting a holder on which an object lens is mounted, as well as resolving a resonance frequency problem and for increasing manufacturing efficiency and reducing the number of parts required, and an optical recording apparatus incorporating such an optical system driving device. The optical system driving device includes a holder holding an optical element; support means for supporting the holder and permitting its displacement in a focusing direction; a carriage mounting the holder and the support means moving in a tracking direction; drive coils included in the holder for displacing the holder in the focusing direction; and a flexible printed board supplying a drive current to the drive coils. The support means includes a fixed portion and an elastic member, one end of which is fixed to the fixed portion and the other end of which is connected to the holder. Further, a vibration damping member, connected to the fixed portion, is mounted on the side of the elastic member and is sandwiched between the flexible printed board and the elastic member.

16 Claims, 10 Drawing Sheets

OPTICAL SYSTEM DRIVING DEVICE HAVING IMPROVED VIBRATIONAL CHARACTERISTICS AND OPTICAL RECORDING APPARATUS INCORPORATING THE SAME

BACKGROUND OF THE INVENTION

1. Field of the Invention

The present invention relates to an optical system driving device, and to an optical recording apparatus incorporating this device.

2. Related Arts

Optical recording mediums, such as magneto-optical disks (MO) or CD-ROMs, which are employed in accordance with various specifications, are in wide use today. And for the optical recording apparatuses that are used to record and reproduce data on such optical recording mediums, optical systems which can project laser beams onto recording faces, or which can receive light reflected from the recording faces, are indispensable.

Further, since to access a predetermined recording track on a recording face a laser beam must be focused on that track, an optical system driving device is also required.

FIG. 7 is a top view of a partial arrangement for an optical recording apparatus, including an optical system driving device which is used for recording and for reproduction. In FIG. 7, an optical recording medium is mounted, with its recording face down, on a shaft which is rotated by a spindle motor 101, and a lens actuator (an optical system driving device) 20 is positioned opposite the recording face of the optical recording medium.

The optical system driving device 20 is driven in the radial direction of the optical recording medium along rails 13 and 14. An object lens 1, which is an optical element, is controlled so that it faces in the direction perpendicular to the recording face of the optical recording medium (the focusing direction), thereby enabling the continuous focusing of a laser beam on a recording track.

FIG. 8 is a partially enlarged perspective view of the optical system driving device 20. The two rails 13 and 14 pass through a carriage 11, on opposite sides of which are provided carriage coils 15 and 16.

When the carriage coils 15 and 16 are electrified, a driving force is generated between magnetic circuits (not shown), and the carriage 11 is displaced along the rails 13 and 14 in the tracking directions indicated by a double-headed arrow in FIG. 8.

A holder 2, which supports the object lens 1, and a support section to which the holder 2 is connected are mounted so that they are recessed in a hollow portion of the carriage 11. Provided as a part of the support section is an elastic member 3, and coils (hidden in FIG. 8) provided on opposite sides of the holder 2 face magnetic circuits 9 and 10.

FIG. 9 is a schematic cross-sectional view of the center portion of the optical system driving device 20 viewed from the direction indicated by an arrow in FIG. 7. In FIG. 9, the optical path of a laser beam 110 is changed perpendicularly by a reflection mirror 12. When a coil 7 (a coil 8 is located on the opposite side) is electrified, a driving force is generated between the magnetic circuits 9 and 10 in FIG. 8, and the holder 2 is displaced. Therefore, the object lens 1 is controlled perpendicular to the recording face of the optical recording medium, and the laser beam 110 is focused on a recording track.

The above described arrangement is the general arrangement of the optical system driving device of the optical recording apparatus. For this arrangement, it is particularly important that the focus of the laser beam 110 be precisely positioned on the recording face of the optical recording medium. Thus, the holder 2 is supported by the support section, and is displaced by the driving force generated between the magnetic circuits 9 and 10 by the current which is supplied to the coils 7 and 8, as was previously described. The problem encountered here results from the unwanted vibration of the elastic member 3, which constitutes part of the support section.

In order to prevent unwanted vibration, conventionally, as is shown in FIGS. 10A to 10C, a vibration damping sheet 30 is attached to a leaf spring 3. In addition, a power supply path 41, which is formed on a flexible printed board 40, supplies a current to the coil 7, and the resultant board 40 is stacked with the vibration damping sheet 30, as is shown in FIG. 10C.

As part of the manufacturing process, the attachment of the vibration damping sheet to the leaf spring 3 complicates the assembly of the optical system driving device 20, and the associated structural requirements increase the number of parts that must be used. In addition, since the flexible printed board 40 is laminated with the vibration damping sheet 30, the rigidity of the leaf spring 3 is increased.

Therefore, the primary resonance frequency in the direction in which the holder 2 is displaced, i.e., in the focusing direction, is increased, and focusing control is difficult.

As another technique, disclosed in Japanese Unexamined Laid Open Patent Publication No. Sho 61-258346 is similar to the arrangement shown in FIGS. 2 and 3 wherein a viscous member is located near the fixed end of a leaf spring and is held by the leaf spring. Further, according to an apparatus disclosed in Japanese Unexamined Laid Open Patent Publication No. Hei 5-325319, a holder on which an object lens is mounted is supported by a leaf spring, and the end of the leaf spring is connected to a fixed member via a sticky member.

As is described above, in a conventional device, the sticky member is provided to reduce the unwanted vibration of the leaf spring. However, a specific structure has not been proposed which would provide for such a sticky member to be introduced and located in the vicinity of the end of the leaf spring.

In Japanese Unexamined Laid Open Patent Publication No. Hei 9-54960, it is taught that a damper member is introduced through a positioning hole which is formed in a leaf spring. However, formation of a hole in a leaf spring to introduce a damper results in a decrease of rigidity of the leaf spring, and if a thicker leaf spring is prepared and used, the primary resonance frequency required for focusing will be increased.

As the carriage 11 (see FIG. 8) is moved in the radial direction of the optical recording medium, inertial forces which act on the lens holder 2 are generated at an elastic focus spring, i.e., the leaf spring 3. Thus, resonance of the leaf spring 3 occurs in the axial direction (direction in which the leaf spring 3 is extended and contracted).

The occurrence of resonance in the axial direction (hereinafter referred to as an axial resonance frequency) can not be avoided. It is preferable that the resonance frequency be increased so that it is as high as possible and so that the ratio of this frequency to the previously described primary resonance frequency be increased.

SUMMARY OF THE INVENTION

One objective of the present invention, therefore, is the provision of an optical system driving device for preventing the unwanted vibration of an elastic member supporting a holder on which an object lens is mounted, as well as resolving a resonance frequency problem, and the provision of an optical recording apparatus incorporating such an optical system driving device.

Another objective of the present invention is the provision of an optical system driving device for resolving a resonance frequency problem affecting an elastic member supporting a holder on which an object lens is mounted, as well as increasing manufacturing efficiency and reducing the number of parts required, and the provision of an optical recording apparatus incorporating such an optical system driving device.

To achieve the above objectives, according to the present invention, basically, an optical system driving device includes:

a holder, which holds an optical element;

support means for supporting the holder and permitting its displacement in a focusing direction;

a carriage, in which both the holder and the support means are mounted and which moves in a tracking direction; and drive coils, which are included in the holder for displacing the holder in the focusing direction; and a flexible printed board for supplying a drive current to the drive coils.

The support means includes a fixed portion and an elastic member, one end of which is fixed to the fixed portion and the other end of which is connected to the holder. Further, a vibration damping member, connected to the fixed portion, is mounted on the side of the elastic member and is sandwiched between the flexible printed board and the elastic member.

As the first feature of the arrangement, the vibration damping member is sticky, and one face adheres to the flexible print substrate.

As the second feature of the arrangement, the vibration damping member is one quarter to one third as long as the elastic member.

As the third feature of the arrangement, the elastic member has a pair of parallel leaf springs.

Further, to achieve the above objectives, according to a different arrangement an optical system driving device includes:

a holder, which holds an optical element;

support means, for supporting the holder and permitting the displacement of the holder in a focusing direction;

a carriage, in which the holder and the support means are mounted and which moves in a tracking direction; and drive coils, which are included in the holder and which cause the holder to be displaced in the focusing direction; and a flexible printed board, for supplying a drive current to the drive coils, wherein the support means includes a fixed portion and a pair of leaf springs, each of which is secured at one end to the fixed portion and is connected at the other end to the holder, and wherein a rectangular hole is formed in the free length portion of each of the leaf springs, so that one side of each of the rectangular holes is substantially aligned with an end side of the fixed portion.

As the first feature of the different arrangement, a pair of parallel leaf springs is used, one end of each is secured, one to the upper and one to the lower face, of the fixed portion.

As the second feature of the different arrangement, the hole is a rectangle, the long sides of which parallel the direction corresponding to the width of the leaf spring.

As the third feature of the different arrangement, the fixed portion has on one side, facing the holder, a first upright portion, and on the opposite side, paralleling the first upright portion, a second upright portion. The sides of the fixed portion are substantially aligned with sides of the rectangular holes formed in the free length portions of the leaf springs.

As the fourth feature of the different arrangement, grooves are formed between the first and the second upright sections of the fixed portion, and the rectangular holes, which are formed in the leaf springs, have long sides which are parallel to the widthwise direction of the fixed portion and short sides which are shorter than the width of the grooves between the first and the second upright sections.

As the fifth feature of the different arrangement, grooves are formed between the first and the second upright sections of the fixed portion, and a vibration damping material is fed through the rectangular holes until it fills the grooves.

Further, to resolve the conventional problem, an optical recording apparatus comprises:

a drive mechanism for rotating a recording medium; and the optical system driving device, which has one of the above described features, wherein the optical element is located opposite the recording face of the recording medium.

The other features of the present invention will become apparent during the course of the explanation of the embodiments, which is given while referring to the accompanying drawings.

DETAILED DESCRIPTION OF THE PREFERRED EMBODIMENTS

Figure 1:
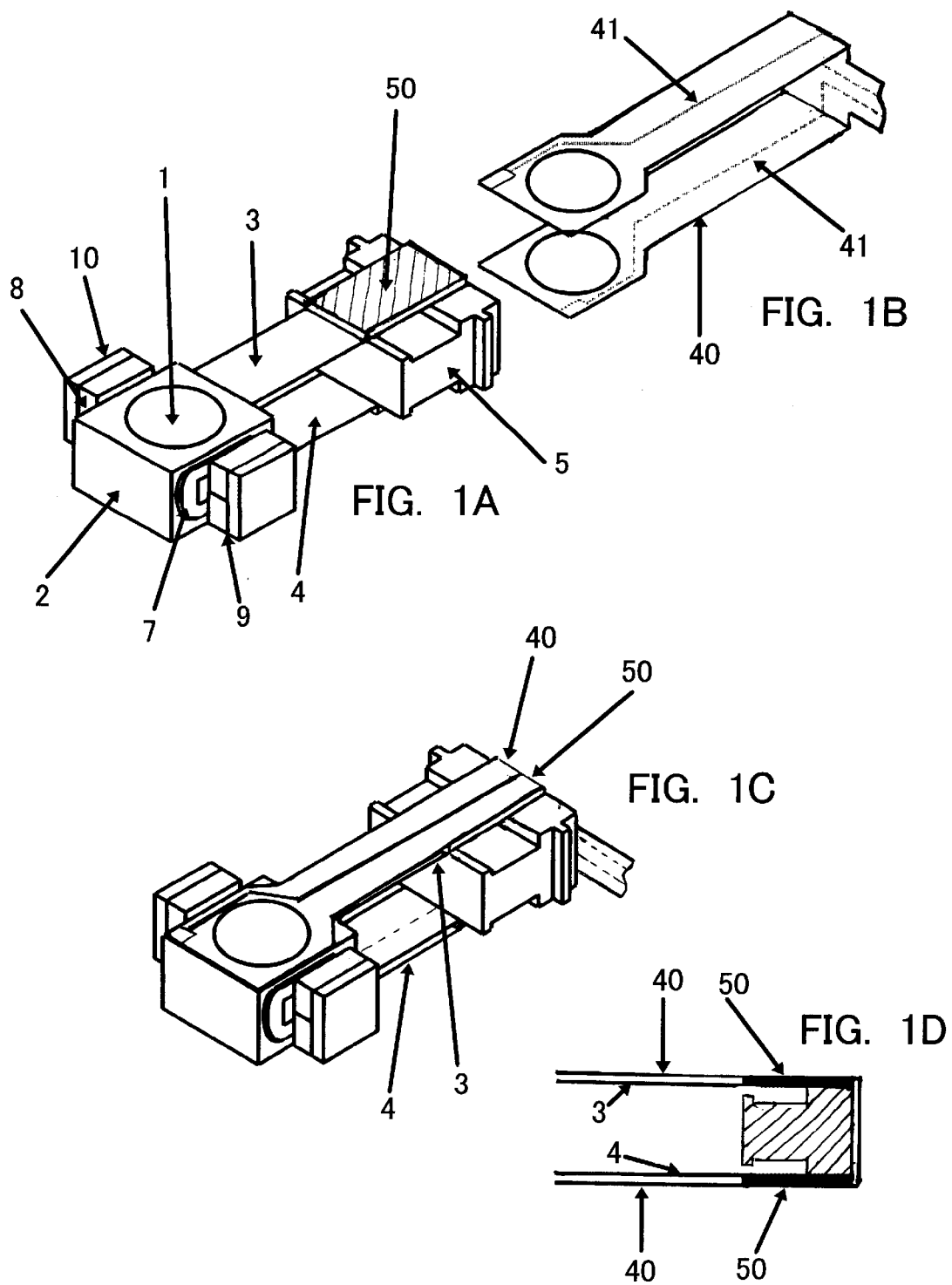
FIGS. 1A to 1D are diagrams showing a mechanism for a holder and support means which are characteristics of an optical system driving device according to one embodiment of the present invention.

The preferred embodiments of the present invention will now be described while referring to the accompanying drawings. The same reference numerals are employed throughout to denote corresponding or identical components.

FIGS. 1A to 1D are diagrams showing the mechanism of a holder and support means, which are the features of an optical system driving device according to a first embodiment of the present invention.

As is shown in FIG. 1A, a holder 2, on which is mounted an object lens 1, is supported by support means constituted by a fixed portion 5 and two parallel leaf springs 3 and 4, which are elastic members, each of which is fixed at one end.

Coils 7 and 8 are attached to opposite sides of the holder 2, facing magnetic circuits 9 and 10. As will be described later, when a current is supplied to the coils 7 and 8, a driving force is generated and the object lens 1, along with the holder 2, is displaced in the focusing direction.

As is shown in FIG. 1B, a path 41 formed in a flexible printed board 40 is employed to supply a current to the coils 7 and 8. As the feature of the present invention, in FIG. 1A vibration damping members 50 are attached to the sides of the leaf springs 3 and 4, which are connected to the fixed portion 5, and, as is shown in FIG. 1C, are sandwiched between the leaf springs 3 and 4 and the flexible printed board 40. FIG. 1D is a cross-sectional view of the fixed portion 5 and its surroundings, and shows how the vibration damping members 50 are sandwiched between the leaf springs 3 and 4 and the flexible printed board 40.

In FIGS. 1A to 1D, the flexible printed board 40 is mounted so that it is positioned along both of the parallel leaf springs 3 and 4; however, the flexible printed board 40 can be mounted so that it is positioned along only one of the leaf springs.

In such a case, two line paths 41 are formed in the flexible print substrate 40 to supply current to the coils 7 and 8, and only one vibration damping member 50 is mounted on the side of the leaf spring 3 or 4, along which the flexible printed board 40 is positioned.

While taking into account the manufacturing process performed for the structure in FIGS. 1A to 1D, the vibration damping member 50 may be adhered in advance to the internal face of the flexible printed board 40, so that the flexible printed board 40 can be easily aligned with and secured to one end of either the leaf spring 3 or 4.

With the above structure, compared with a structure where a vibration damping sheet is directly adhered to the entire free length portion of a leaf spring, the unwanted vibration of the leaf springs 3 and 4 can be effectively reduced, and an increase in the primary resonance frequency of the leaf springs 3 and 4 in the focusing direction can be prevented. It should be noted that when the elastic leaf springs 3 and 4 vibrate in the focusing direction they not only have a primary resonance frequency but also a vibration frequency in the axial direction, i.e., an axial resonance frequency.

Generally, when the primary resonance frequency is increased, power consumption is also increased, a condition which is not preferable for an apparatus. Further, when the axial resonance frequency is low, a satisfactory servo band area can not be obtained for tracking control, which is also not preferable. Therefore, ideally, an apparatus should have a low primary resonance frequency and a high axial resonance frequency. A resonance ratio represented as follows is employed as a parameter for the technical evaluation of these frequencies.

resonance ratio=axial resonance frequency/primary resonance frequency

It has been ascertained that higher resonance ratios provide better results.

Through calculations performed using various parameters for the sizes the leaf springs 3 and 4, the present inventor confirmed that a more satisfactory resonance ratio could be acquired by using leaf springs having a longer free length; that the width of the leaf springs did not affect the resonance ratio; and that a more satisfactory resonance ratio could also be acquired by using thinner leaf springs.

In addition, the present inventor found that the resonance ratio can be controlled not only by adjusting the parameters for the leaf springs 3 and 4, but also by forming holes in the leaf springs 3 and 4. As comparison examples, the following conditions were assumed for an arrangement in which no holes were formed in the leaf springs 3 and 4.

spring free length: 10 mm spring width: 4 mm spring thickness: 30 $\mu$m mass of a system constituted by the holder 2, the object lens 1 and the coils 7 and 8: 0.3 g modulus of elasticity of springs: $1.7 \times 10^4$ kgf/mm$^2$ The results obtained under these conditions were:

primary resonance frequency: 55.12 Hz . . . (a)

axial resonance frequency: 18373.95 Hz . . . (b).

Here, (b)/(a) is 333.3.

Figure 2:
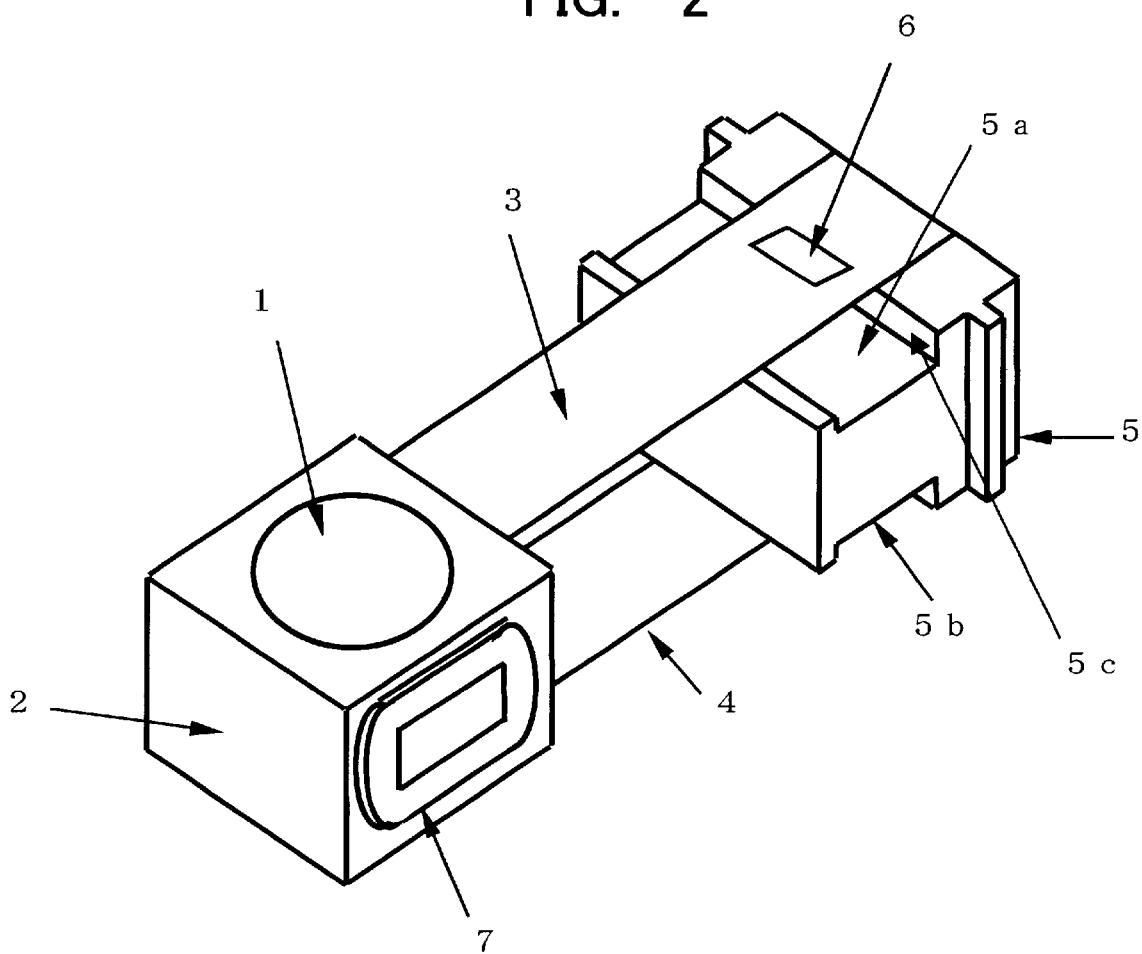
FIG. 2 is a schematic diagram showing one part of the optical system driving device according to a second embodiment wherein a hole is formed in a leaf spring, which is an elastic member.

Following this, calculations were performed for leaf springs 3 and 4 in which holes 6 were formed, as is shown in FIG. 2, for which different parameters were employed.

As in the previous comparison example, the spring free length was 10 mm, the thickness of the springs 3 and 4 was 30 $\mu$m, and the mass of the system of the holder 2 was 0.3 g.

The results shown for calculation value 1 are the ones obtained when 1 mm×1 mm holes were used and the positions of the holes 6 were changed. In Table 1, "Distance" is the measurement from the juncture (at edge 5c of the fixed portion 5 in FIG. 2) of the fixed portion 5 and the free length portion of the leaf spring 3 to the edge of the hole 6 shown adjacent to the side of the fixed portion 5.

TABLE 1 calculation value 1
<the location of the hole was changed>

| Distance (mm) | Spring width (mm) | Primary resonance frequency (HZ) (a) | Axial resonance frequency (Hz) (b) | Resonance ratio (b)/(a) |
|---|---|---|---|---|
| 0.00 | 4.00 | 53.0725 | 18075.17 | 340.58 |
| 1.00 | 4.00 | 53.8511 | 18075.17 | 335.65 |
| 2.00 | 4.00 | 54.4581 | 18075.17 | 331.91 |
| 4.50 | 4.00 | 55.1127 | 18075.17 | 327.97 |
| 5.00 | 4.00 | 55.0860 | 18075.17 | 328.13 |
| 9.00 | 4.00 | 53.0725 | 18075.17 | 340.58 |

From the results shown for calculation value 1, it is apparent that the nearer the holes are formed to the fixed ends of the leaf springs 3 and 4, the better are the results that are obtained.

In Table 2 are shown the results obtained for calculation value 2 when the length of the holes (the size in the longitudinal direction of the leaf springs) was changed. The "Distance" to the holes is 0 mm and the size of the holes in the widthwise direction of the springs is 1 mm.

TABLE 2 calculation value 2
<the length of the hole was changed>

| Longitudinal Hole size (mm) | Spring width (mm) | Primary resonance frequency (Hz)/(a) | Axial resonance frequency (Hz)/(b) | Resonance ratio (b)/(a) |
| --- | --- | --- | --- | --- |
| 1.00 | 4.00 | 53.0725 | 18075.17 | 340.58 |
| 1.81 | 4.00 | 52.1674 | 17843.55 | 342.04 |
| 2.00 | 4.00 | 52.0234 | 17790.50 | 341.97 |
| 3.00 | 4.00 | 51.5668 | 17518.88 | 339.73 |

From the results shown for calculation value 2, it is apparent that the resonance ratio is little affected by the size of the holes in the longitudinal direction of the leaf springs. Next, calculations were performed while the width of the holes was changed. In Table 3 are shown the calculation results obtained in this case. The "Distance" to the holes is 0 mm, the same as it was for calculation value 2, but the size of the holes in the longitudinal direction of the leaf springs is 1 mm.

TABLE 3 calculation value 3
<the width of the hole was changed>

| Spring width (mm) | Hole width (mm) | Primary resonance frequency (Hz) (a) | Axial resonance frequency (HZ) (b) | Resonance ratio (b)/(a) |
| --- | --- | --- | --- | --- |
| 4.00 | 1.00 | 53.0725 | 18075.17 | 340.58 |
| 4.00 | 2.00 | 53.8660 | 17518.88 | 351.32 |
| 4.00 | 3.00 | 44.0796 | 16115.02 | 365.59 |
| 4.00 | 3.23 | 42.0019 | 15421.90 | 367.17 |
| 4.00 | 3.50 | 38.9033 | 14092.18 | 362.24 |

From the results shown for calculation value 3, it is apparent that the resonance ratio increased in consonance with the increase in the width of the holes, and that a size was found at which the resonance ratio was extremely large. As shown in Table 3, when the width of the holes was 3.23 mm, the maximum resonance ratio was obtained.

Using the above calculation values 1 to 3, it was found that the nearer the holes were formed to the end of the leaf springs 3 and 4, and the wider the holes were, the greater the resonance ratio of the axial resonance frequency to the primary resonance frequency became. Therefore, it is apparent that satisfactory effects can be obtained for the optical system driving device.

Figure 3:
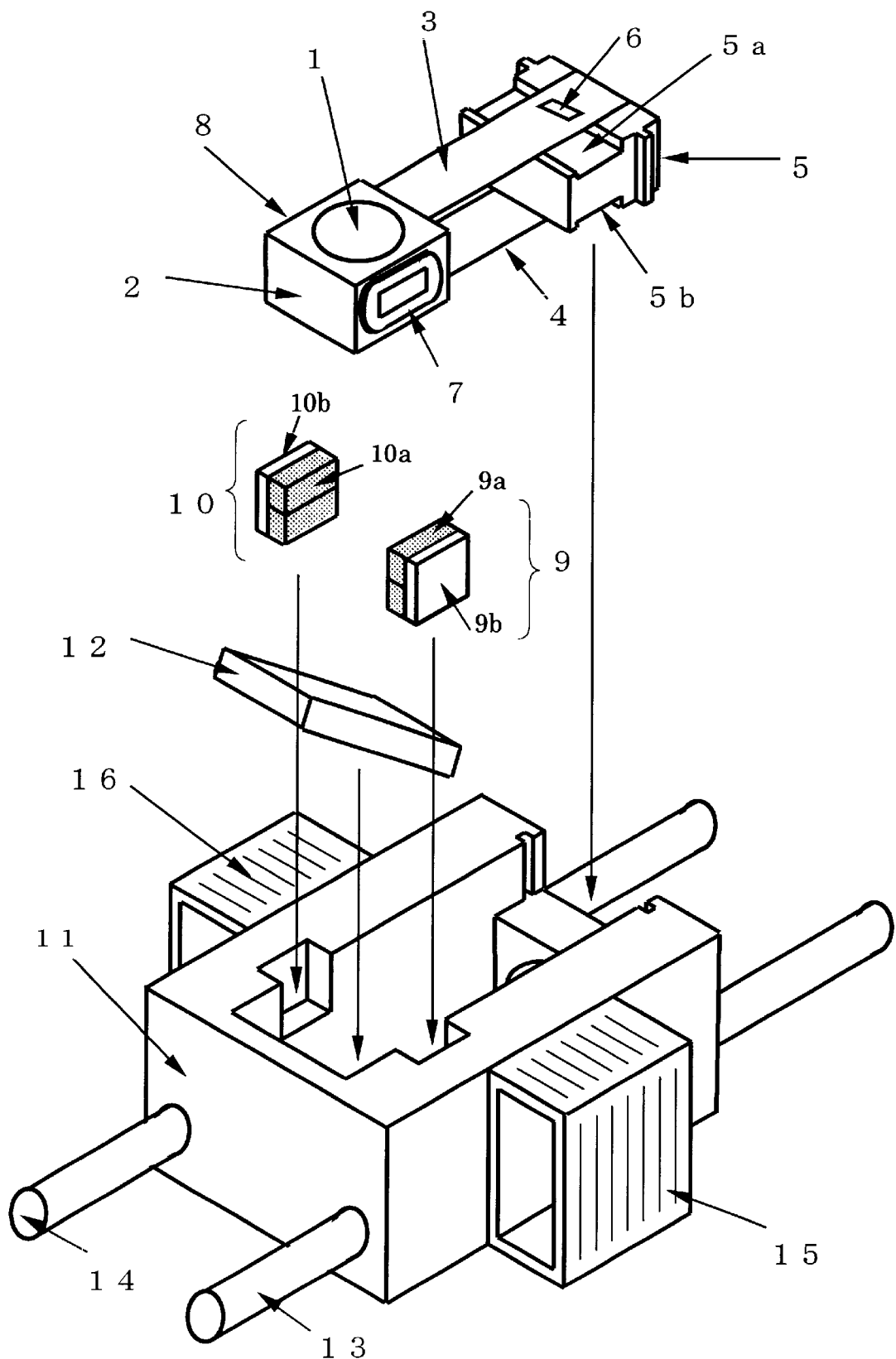
FIG. 3 is a diagram showing the assembly of the optical system driving device, which includes the part shown in FIG. 2.
Figure 4:
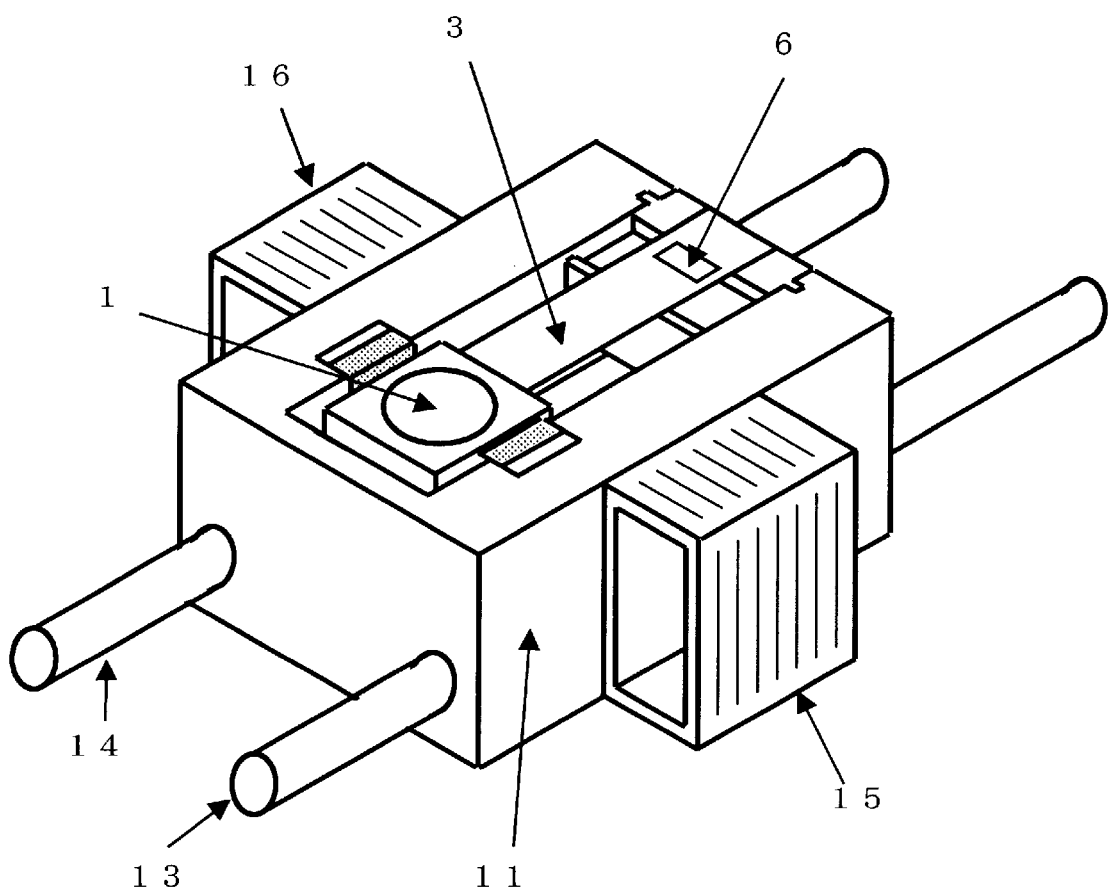
FIG. 4 is a perspective view of the assembly in FIG. 3, i.e., the complete optical system driving device.

FIG. 3 is a diagram showing the assembly, according to a second embodiment of the present invention, of an optical system driving device for which holes 6 are formed in leaf springs 3 and 4. And FIG. 4 is a perspective view of the product shown in FIG. 3 after assembly, i.e., the complete optical system driving device.

As in FIG. 1, the device shown is an example mechanism consisting of a holder and support means, which is the feature of the optical system driving device of the present invention.

In FIG. 3, a reflection mirror 12 is positioned in the hollowed out portion of a carriage 11, in which an assembly consisting of the holder 2 and the support means is mounted. Magnetic circuits 9 and 10 are mounted, in grooves formed in internal walls of the hollowed out portion of the carriage 11, so that they face coils 7 and 8, which are attached to the sides of the holder 2.

FIGS. 5A to 5D are detailed diagrams showing the relationship between the magnetic circuits 9 and 10 and the coils 7 and 8. Since the same arrangement is employed for both of the magnetic circuits 9 and 10, only the positional relationship which exists between the coil 8 and the magnetic circuit 10 is shown. The support means is constituted by a fixed portion 5 and leaf springs 3 and 4, which are elastic members.

Figure 5A:
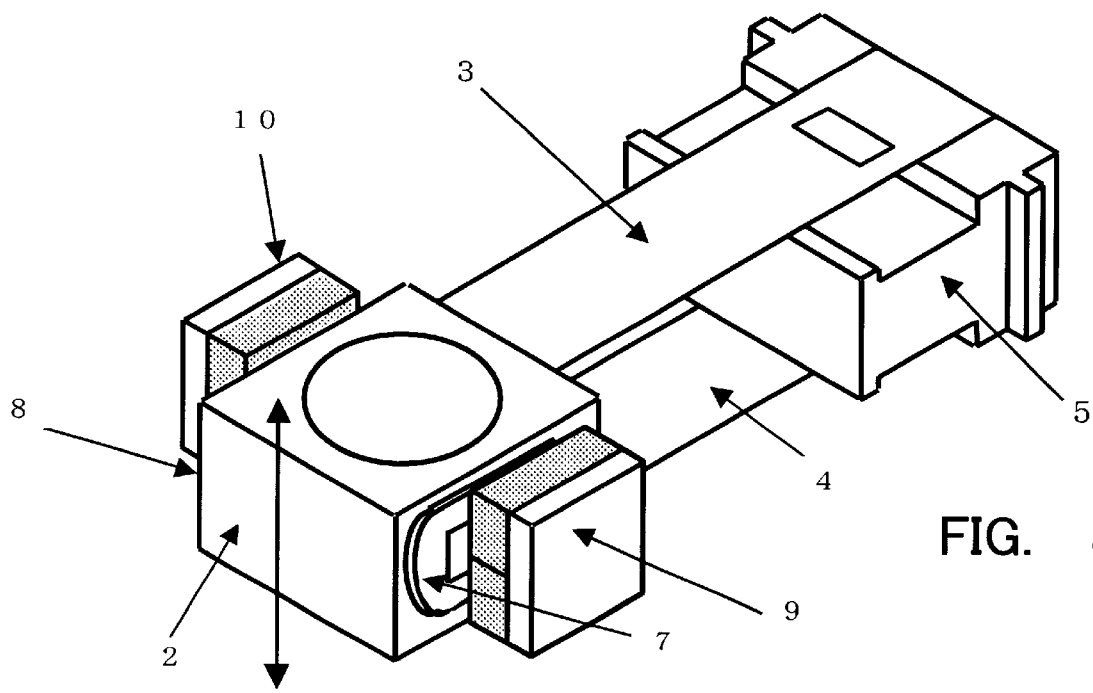
FIGS. 5A to 5D are detailed diagrams showing the relationship of magnetic circuits and coils.

As is shown in FIG. 5A, one end of each leaf spring 3 and 4 is connected to the fixed portion 5, and the other end is connected to the holder 2. The coils 7 and 8 are attached to the sides of the holder 2, and face the magnetic circuits 9 and 10, while, as is shown in FIG. 3, the holder 2 is contained in the carriage 11.

Figure 5B:
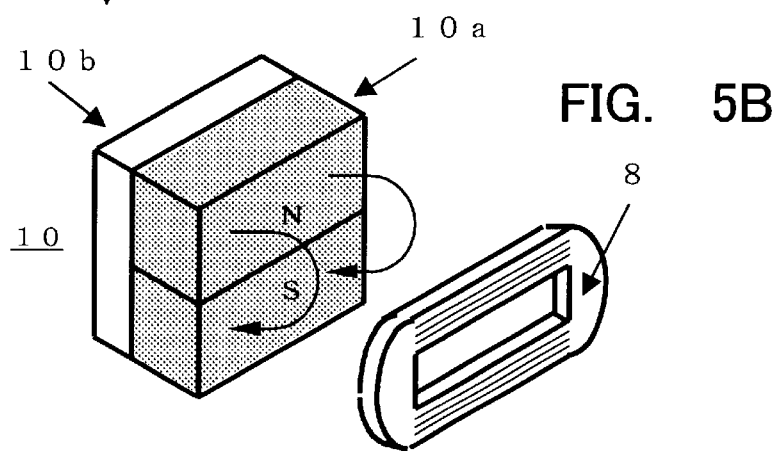

In FIG. 5B the application state is shown wherein the magnetic circuit 10 faces the coil 8. The magnetic circuit 10 is constituted by a yoke 10b and a magnet 10a, which is attached to the yoke 10b and which has NS poles on its surface.

Figure 5C:
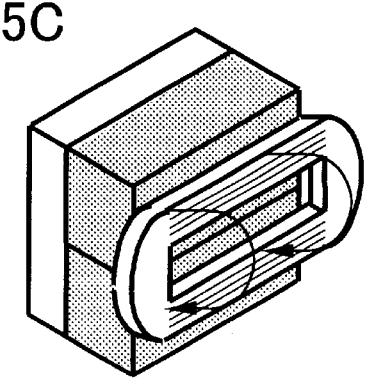
Figure 5D:
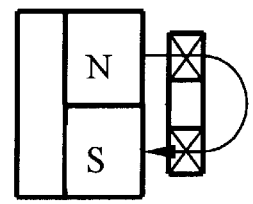

When, as is shown in FIGS. 5C and 5D, the magnetic flux of the magnet 10a passes across the coil 8 and a current is supplied to the coil 8, a driving force is generated, and, as is shown in FIG. 5A, the holder 2 is displaced in one of the directions indicated by the double-headed arrow. Thus, the object lens 1 can be focused on the recording face. In FIGS. 2 to 5, holes 6 are formed in both of the leaf springs 3 and 4, even though in the drawings the hole 6 in the leaf spring 4 is hidden.

A hole 6 formed in a free length portion of a leaf spring 3 or 4 has a rectangular shape, one side of which is positioned immediately adjacent to an edge 5c of the fixed portion 5. The hole 6 is so formed that the side extending in the widthwise direction of the leaf spring 3 or 4 is the long side. These conditions are based on the calculation values 1, 2 and 3.

Figure 6:
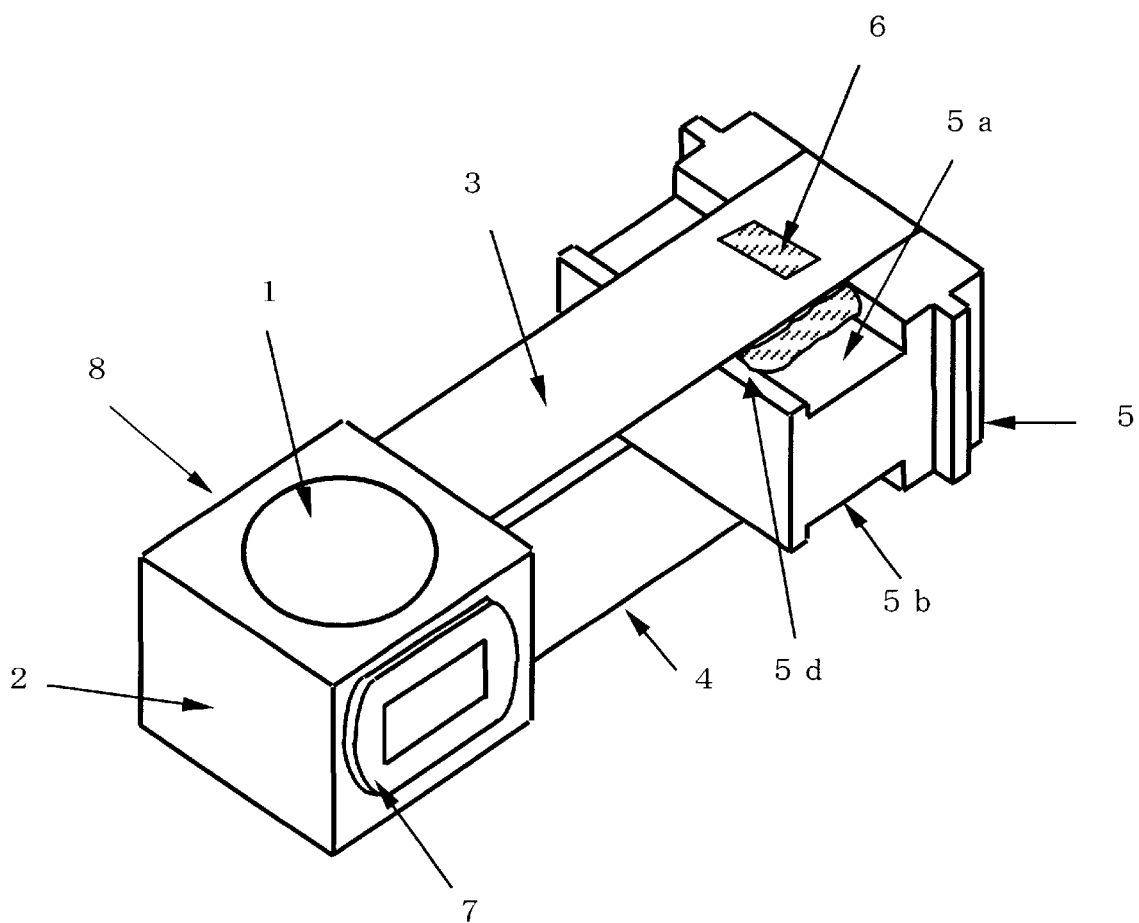
FIG. 6 is a diagram showing the arrangement, according to a third embodiment of the present invention, wherein a vibration damping material is introduced into a fixed portion through a hole formed in a leaf spring.
Figure 7:
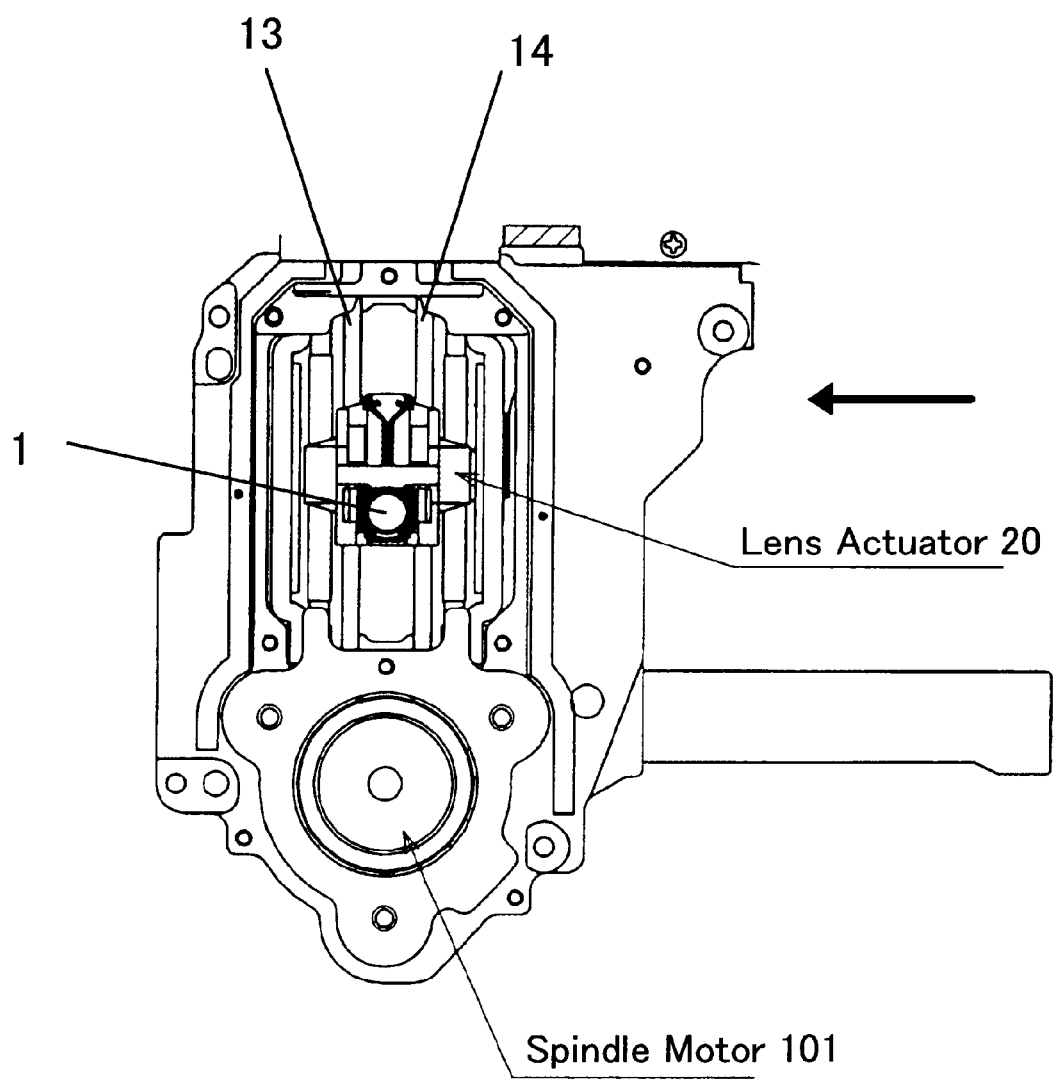
FIG. 7 is a top view of a partial arrangement of an optical recording apparatus, including an optical system driving device.
Figure 8:
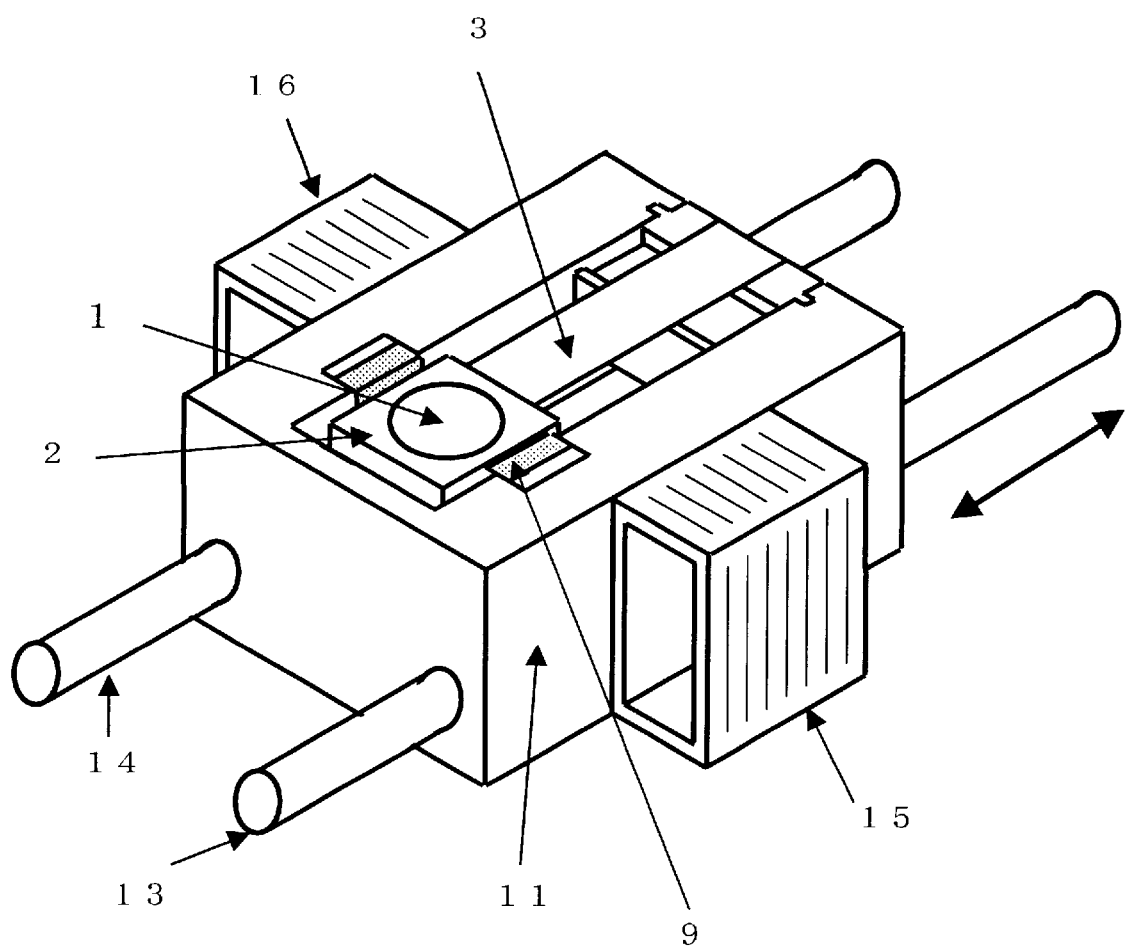
FIG. 8 is a partially enlarged perspective view of the optical system driving device.
Figure 9:
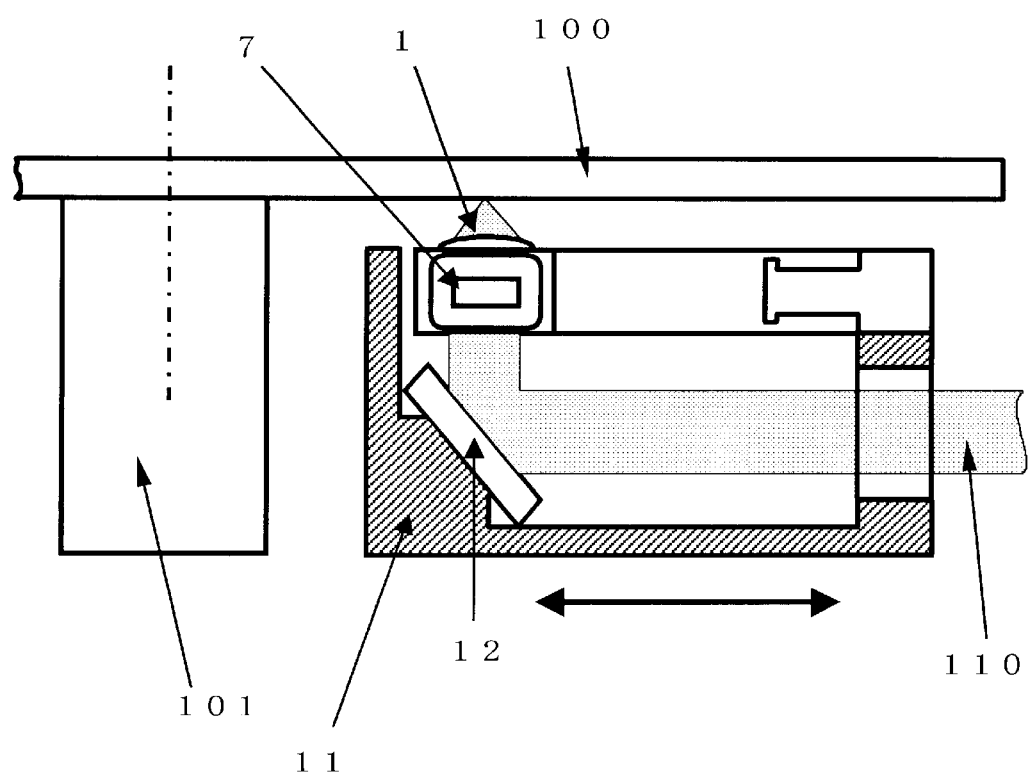
FIG. 9 is schematic cross-sectional view of the center portion of the optical system driving device viewed from the direction indicated by the arrow in FIG. 7.
Figures 10A, 10B, 10C:
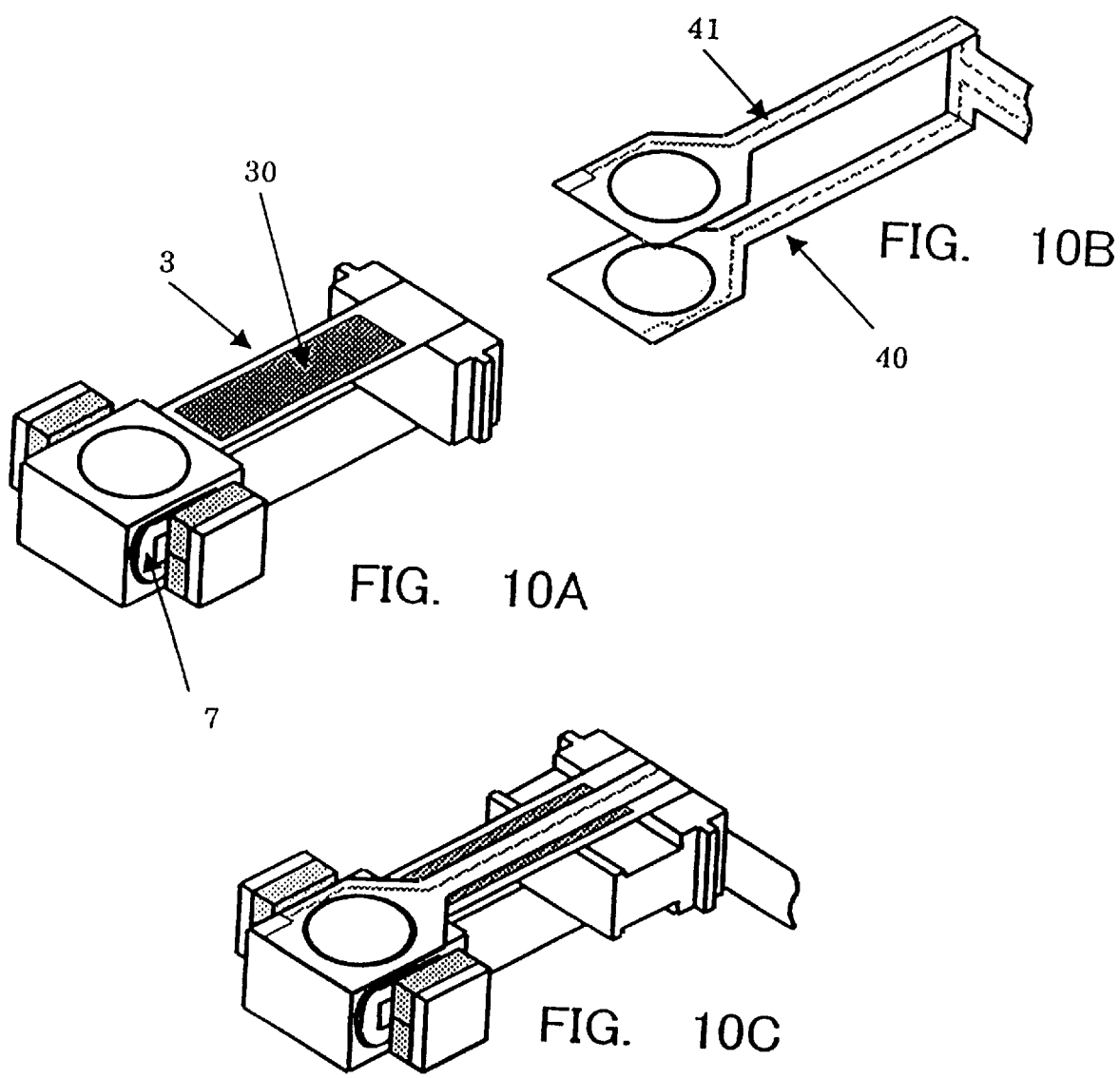
FIGS. 10A to 10C are diagrams showing one conventional arrangement for preventing unwanted vibration.

FIG. 6 is a diagram showing a third embodiment of the present invention, wherein a vibration damping material is introduced into grooves in fixed portion 5 by using holes 6 formed in leaf springs 3 and 4.

Specifically, for the fixed portion 5, a first upright portion 5d is formed on the side nearest the holder 2, and a second upright portion 5e is formed parallel to and opposite the first upright portion 5d. These upright portions 5d and 5e define grooves 5a and 5b. One side of each of the holes 6 in the leaf springs 3 and 4 is immediately adjacent to the edge of the second upright portion 5e of the fixed portion 5.

As is shown in FIG. 6, a vibration damping material is introduced through the holes 6 into the grooves 5a and 5b, which are defined by the two upright portions 5d and 5e. The existing state when this material is introduced is shown in FIG. 6.

In the explanation given for the embodiments while referring to the accompanying drawings, according to the present invention, holes at optimal locations and having optimal widths are formed in order to increase the resonance ratio. In addition, a vibration damping material is introduced through the holes, so that an optical system driving device having satisfactory vibration characteristics can be provided.

As a result, an optical recording apparatus can be obtained which provides superior precision and stability for focusing and tracking control.

It should be understood that the above embodiments are merely examples, which are used to explain the present invention, and that the present invention is not limited to these embodiments. In addition, the scope of the invention represented by the accompanying claims lies within the range of the protection provided for this invention.

What is claimed is:

1. An optical system driving device comprising:
   a holder holding an optical element;
   support means for supporting the holder and permitting its displacement in a focusing direction;

the support means including a fixing portion and an elastic member, having two ends, one end of which is fixed to the fixing portion and the other end of which is connected to the holder;

a carriage mounting the holder and the support means and moving in a tracking direction;

drive coils secured to the holder for displacing the holder in the focusing direction;

a flexible printed board provided on the elastic member for supplying a drive current to the drive coils; and a vibration damping sheet member mounted on the one end of the elastic member fixed to the fixing portion and generally only in a region where the elastic member and the fixing portion overlap, and held between the flexible printed board and the elastic member.

2. The optical system driving device according to claim 1, wherein one face of the vibration damping sheet member adheres to the flexible print board.

3. The optical system driving device according to claim 2, wherein the elastic member has a pair of parallel leaf springs.

4. The optical system driving device according to claim 1, wherein the vibration damping sheet member is one quarter to one third as long as the elastic member.

5. The optical system driving device according to claim 4, wherein the elastic member has a pair of parallel leaf springs.

6. The optical system driving device according to claim 1, wherein the elastic member has a pair of parallel leaf springs.

7. An optical recording apparatus comprising:

a drive mechanism for rotating a recording medium; and an optical system driving device including;

a holder holding an optical element;

support means for supporting the holder and permitting its displacement in a focusing direction;

the support means including a fixing portion and an elastic member having two ends, one end of which is fixed to the fixing portion and the other end of which is connected to the holder;

a carriage mounting the holder and the support means and moving in a tracking direction; and drive coils secured to the holder for displacing the holder in the focusing direction;

a flexible printed board provided on the elastic member for supplying a drive current to the drive coils; and a vibration damping sheet member mounted on the one end of the elastic member fixed to the fixing portion and generally only in a region where the elastic member and the fixing portion overlap, and held between the flexible printed board and elastic member, wherein the optical element is located opposite the recording face of the recording medium.

8. The optical system driving device according to claim 7, wherein one face of the vibration damping sheet member adheres to the flexible printed board.

9. The optical system driving device according to claim 7, wherein the vibration damping sheet member is one quarter to one third as long as the elastic member.

10. The optical system driving device according to claim 7, wherein he elastic member has a pair of parallel leaf springs.

11. An optical recording apparatus comprising:

a drive mechanism for rotating a recording medium; and an optical system, driving device including;

a holder having an optical element;

a support means for supporting the holder and permitting the displacement of the holder in a focusing direction;

a carriage mounting the holder and the support means moving a tracking direction;

drive coils secured to the holder and for causing the holder to be displaced in the focusing direction;

a fixing portion having on one side, a first upright portion facing the holder and on the opposite side, a second upright portion paralleling the first upright portion with a height higher than that of the first upright portion, and a groove formed between the first and second upright sections;

a pair of parallel leaf springs respectively having one end secured to the second upright portion of the fixing portion and another end connected to the holder, and having a rectangular hole positioned in the groove;

a flexible printed board provided on the pair of leaf springs for supplying a drive current to the drive coils; and a vibration damping material, which is introduced between the first and second upright portions and in the groove, contacting the leaf spring, wherein said optical element is located opposite the recording face of the recording medium.

12. An optical recording apparatus according to claim 11; wherein a pair of parallel leaf springs is used, one end of each is secured, one to the upper and one to the lower face, of the fixed portion.

13. An optical system driving device comprising:

a holder having an optical element;

support means for supporting the holder and permitting the displacement of the holder in a focusing direction;

a carriage mounting the holder and the support means moving a tracking direction;

drive coils secured to the holder for causing the holder to be displaced in the focusing direction;

a fixing portion having on one side, a first upright portion facing the holder and on the opposite side, a second upright portion paralleling the first upright portion with a height higher than that of the first upright portion, and a groove formed between the first and second upright sections;

a pair of parallel leaf springs respectively having one end secured to the second upright portion of the fixing portion and another end connected to the holder, and having a rectangular hole positioned on the groove;

a flexible printed board provided on the pair of leaf springs for supplying a drive current to the drive coils; and a vibration damping material, which is introduced between the first and second upright portions and in the groove, contacting the leaf spring.

14. The optical system driving device according to claim 13, wherein long sides of the rectangular hole parallel the the first and second upright portions of the fixing portion.

15. The optical system driving device according to claim 13, wherein the damping material is introduced by being fed through the rectangular hole.

16. The optical system driving device according to claim 11, wherein the damping material is introduced by being fed through the rectangular hole.

* * * * *